US012225988B2

(12) United States Patent
Duncan et al.

(10) Patent No.: US 12,225,988 B2
(45) **Date of Patent: *Feb. 18, 2025**

(54) MAGNETIC JEWELRY CLASP

(71) Applicants: William Stuart Duncan, Georgetown, SC (US); Beeman E. Burgoon, Jr., Georgetown, SC (US)

(72) Inventors: William Stuart Duncan, Georgetown, SC (US); Beeman E. Burgoon, Jr., Georgetown, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,215

(22) Filed: Jul. 31, 2023

(65) Prior Publication Data

US 2024/0016263 A1 Jan. 18, 2024

Related U.S. Application Data

(63) Continuation of application No. 17/389,816, filed on Jul. 30, 2021, now Pat. No. 11,737,527, which is a continuation of application No. 16/515,088, filed on Jul. 18, 2019, now Pat. No. 11,076,661, which is a continuation of application No. 16/044,700, filed on Jul. 25, 2018, now Pat. No. 10,376,022.

(60) Provisional application No. 62/538,143, filed on Jul. 28, 2017.

(51) Int. Cl.
*A44C 5/20* (2006.01)
*H01F 7/02* (2006.01)

(52) U.S. Cl.
CPC ......... *A44C 5/2071* (2013.01); *H01F 7/0263* (2013.01); *A44D 2203/00* (2013.01)

(58) Field of Classification Search
CPC ........... Y10T 24/32; A44C 5/18; A44C 5/185; A44B 18/0088; H01F 7/0263; A44D 2203/00
USPC ........................................................... 63/3.1
See application file for complete search history.

(56) References Cited

U.S. PATENT DOCUMENTS

| | | | |
|---|---|---|---|
| 2,615,227 | A | 10/1952 | Hornik |
| 2,648,884 | A | 8/1953 | Loofboro |
| 3,008,209 | A | 11/1961 | Kurt |
| 4,231,137 | A | 11/1980 | Fujimoto |
| 4,901,405 | A | 2/1990 | Grover et al. |
| 5,572,887 | A | 11/1996 | Geswelli |
| 5,664,298 | A | 9/1997 | Nessar-Ivanovic |
| 6,598,271 | B2 | 7/2003 | Nire |
| 6,598,272 | B2 | 7/2003 | Nire |
| 7,007,507 | B2 | 3/2006 | Enevoldson |
| 9,101,185 | B1 | 8/2015 | Greenberg |
| 10,897,967 | B1 | 1/2021 | Plotner |
| 2002/0108217 | A1 | 8/2002 | Cogdill |

(Continued)

FOREIGN PATENT DOCUMENTS

DE 202014105724 U1 3/2016

*Primary Examiner* — Jack W Lavinder

(74) *Attorney, Agent, or Firm* — Carlson, Gaskey & Olds, P.C.

(57) ABSTRACT

A jewelry clasp is disclosed and includes a first part including a first magnet, a first groove and a first catch and a second part including a second magnet, a second groove and a second catch. The first and second magnets generate an attractive force holding the first part to the second part, the first catch is received in the second groove and the second catch is received in the first groove. A relief disposed on at least one of the first part and the second part at an interface between the first part and the second part is provided to aid in releasing the first part from the second part.

17 Claims, 11 Drawing Sheets

(56) References Cited

U.S. PATENT DOCUMENTS

| | | | |
|---|---|---|---|
| 2004/0107547 | A1 | 6/2004 | Chung |
| 2012/0000038 | A1 | 1/2012 | Humphries et al. |
| 2012/0044031 | A1 | 2/2012 | Ninomiya |
| 2014/0277103 | A1 | 9/2014 | Esposito |
| 2015/0074954 | A1 | 3/2015 | Pruitt et al. |
| 2016/0316839 | A1 | 11/2016 | King |
| 2018/0132570 | A1 | 5/2018 | Chen et al. |

MAGNETIC JEWELRY CLASP

CROSS REFERENCE TO RELATED APPLICATION

This application is a continuation of U.S. patent application Ser. No. 17/389,816 filed on Jul. 30, 2021, which is a continuation of U.S. patent application Ser. No. 16/515,088 filed on Jul. 18, 2019 which is now granted as U.S. Pat. No. 11,076,661 issued on Aug. 3, 2021, which is a continuation of U.S. patent application Ser. No. 16/044,700 filed on Jul. 25, 2018 which is now granted as U.S. Pat. No. 10,376,022 issued on Aug. 13, 2019, which claims priority to U.S. Provisional Application No. 62/538,143 filed on Jul. 28, 2017.

BACKGROUND

This disclosure generally relates to a clasp for securing ends of a jewelry item such as a bracelet and necklace. More particularly, this disclosure relates to a clasp that includes two parts secured together with magnets and a relief for prying apart the two parts.

A jewelry item typically includes a clasp to secure ends of an elongated chain together. The clasp may be very small to match the jewelry item and not detract from the aesthetic nature of the jewelry. Unfortunately, such small clasps become difficult to attach and to remove. Attachment and release of the clasp becomes even more difficult for wearers with limited use and/or dexterity of the fingers and hands. Making the clasp easier to unlatch may also result in a decreased ability to hold ends of the jewelry item.

Magnets provide an attractive force holding the clasp together. However, the force required to hold the clasp together is effective in limited directions. Accordingly, the forces required by the magnet to hold the clasp together as desired can make the clasp difficult to unlatch.

SUMMARY

A jewelry clasp according to an exemplary embodiment of this disclosure, among other possible things includes a first part including a first magnet, a first groove and a first catch, a second part including a second magnet, a second groove and a second catch, wherein the first and second magnets generate an attractive force holding the first part to the second part, the first catch is received in the second groove and the second catch is received in the first groove and at least one relief disposed on at least one of the first part and the second part at an interface between the first part and the second part to aid in releasing the first part from the second part.

A jewelry item assembly according to another exemplary embodiment of this disclosure, among other possible things includes an elongated member including a first end and a second end, a first part including a first magnet, a first groove and a first catch and a second part including a second magnet, a second groove and a second catch. The first and second magnets generate an attractive force holding the first part to the second part with the first catch received in the second groove and the second catch received in the first groove. At least one relief is disposed at an interface between the first part and the second part to aid in releasing the first part from the second part. The relief is a recessed surface on at least one side of one of the first part and the second part and Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The various features and advantages provided in this disclosure will become apparent to those skilled in the art from the following detailed description of the currently preferred embodiment. The drawings that accompany the detailed description are described below.

DETAILED DESCRIPTION

Figure 1:
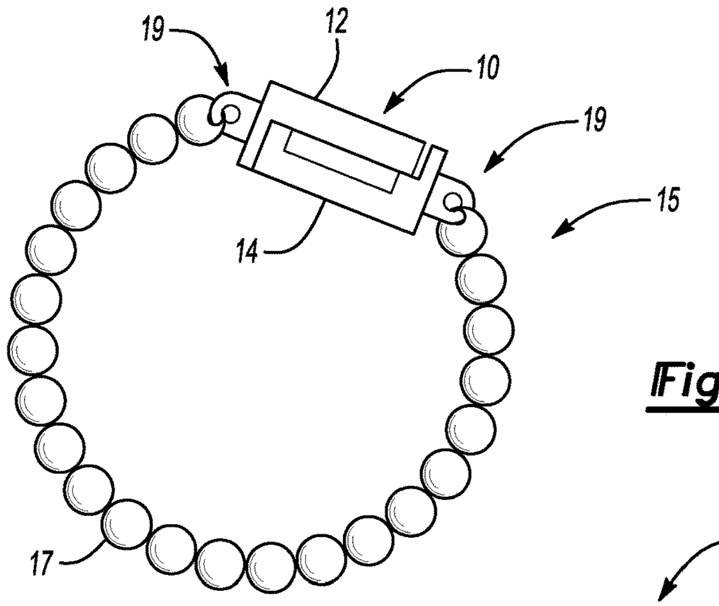
FIG. 1 is a schematic representation of a jewelry item.
Figure 2:
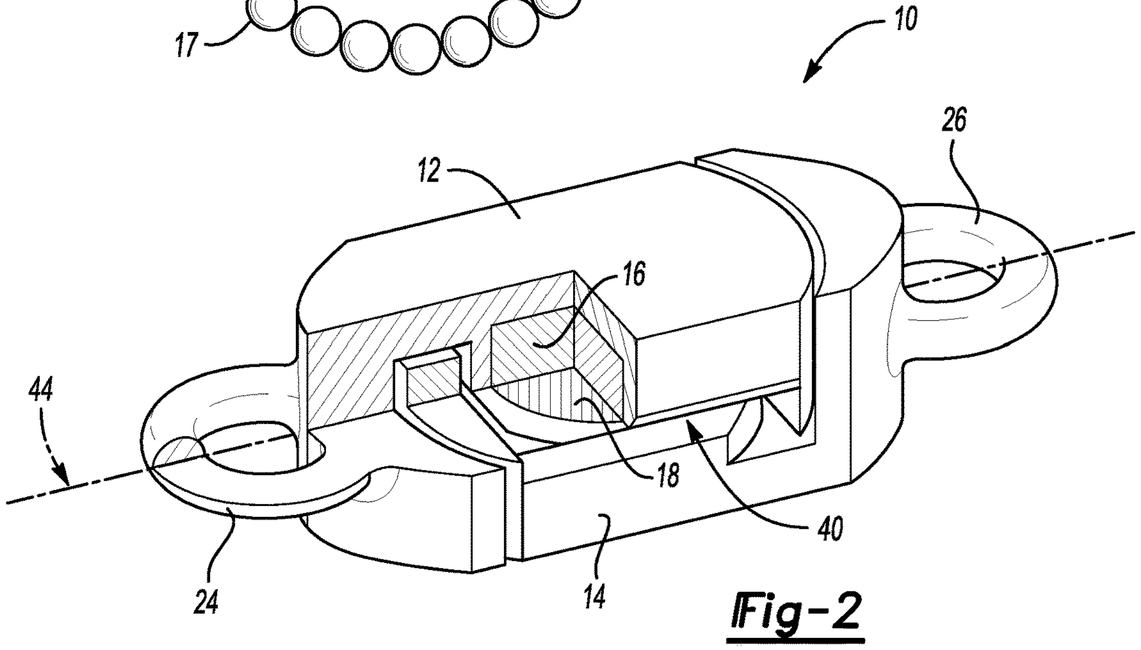
FIG. 2 is a partial sectional view of an example jewelry clasp embodiment.

Referring to FIGS. 1 and 2, an example jewelry item 15 is schematically illustrated and includes a clasp assembly 10 that secures ends 19 of an elongated member 17. In this example, the member 17 is a chain, however other elongated members such as rope, thread, links, or other jewelry arrangements that form a circle will benefit from this disclosure.

The clasp assembly 10 includes a first part 12 that is securable to a second part 14. The first part 12 and the second part 14 are substantially identical and are mated together to hold ends of the jewelry item 15. Each of the clasp parts 12, 14 include a magnet 16, 18 that is securable together to hold together the clasp 10. The clasp 10 also includes attachment rings 24, 26 for securement to the ends 19 of the member 17.

Figure 3:
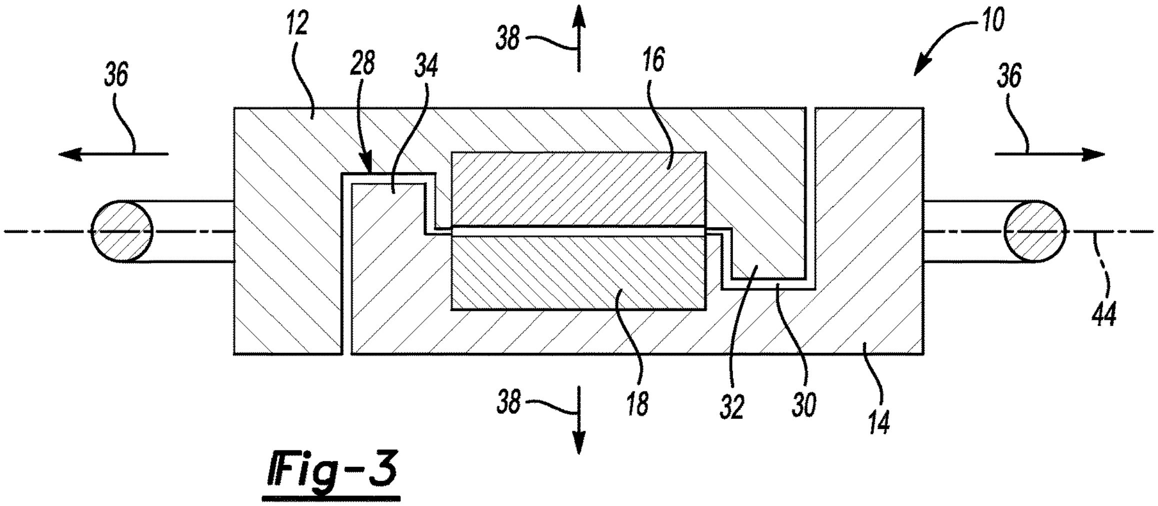
FIG. 3 is a cross-sectional view of the example jewelry clasp.
Figure 4:
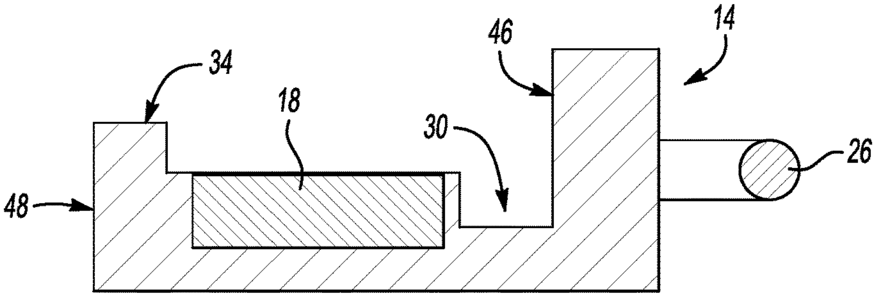
FIG. 4 is a side view of one half of the example jewelry clasp.
Figure 5:
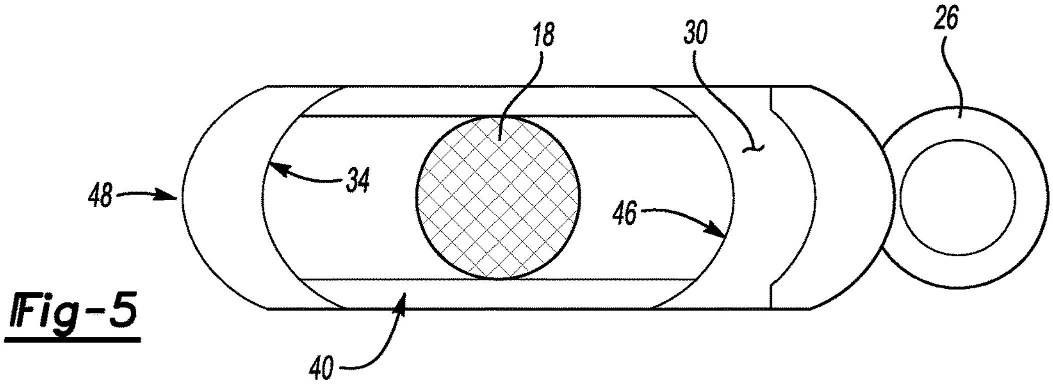
FIG. 5 is a top view of one half of the example jewelry clasp.
Figure 6:
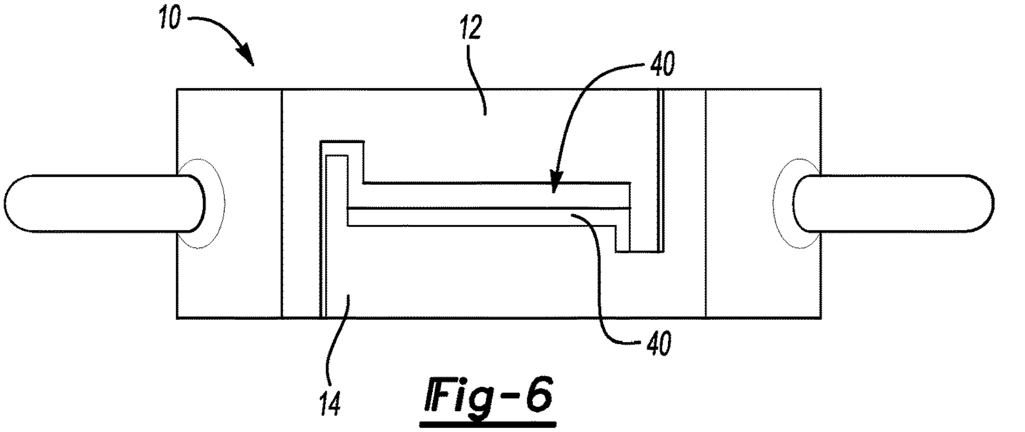
FIG. 6 is a side view of the example jewelry clasp assembly.
Figure 7:
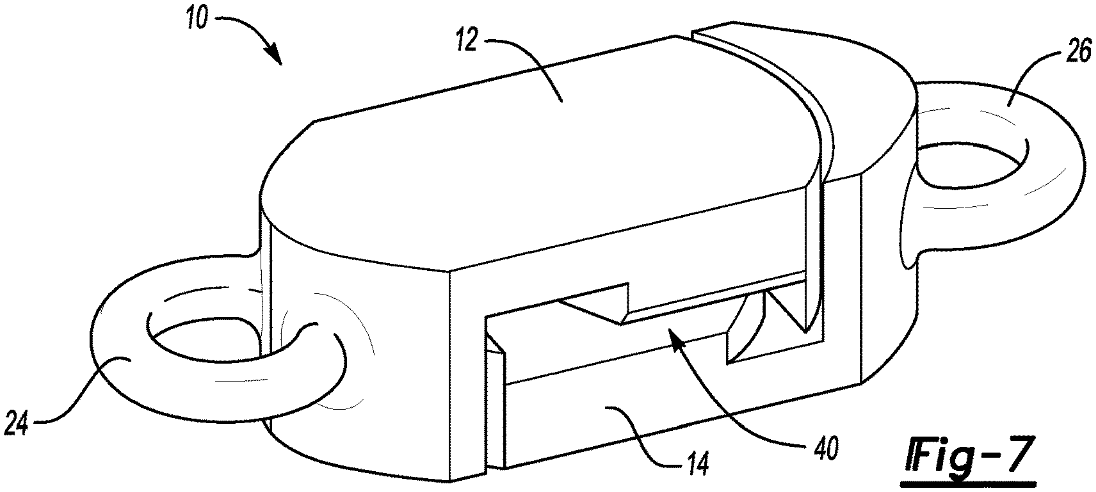
FIG. 7 is a perspective view of the example jewelry clasp.
Figure 8:
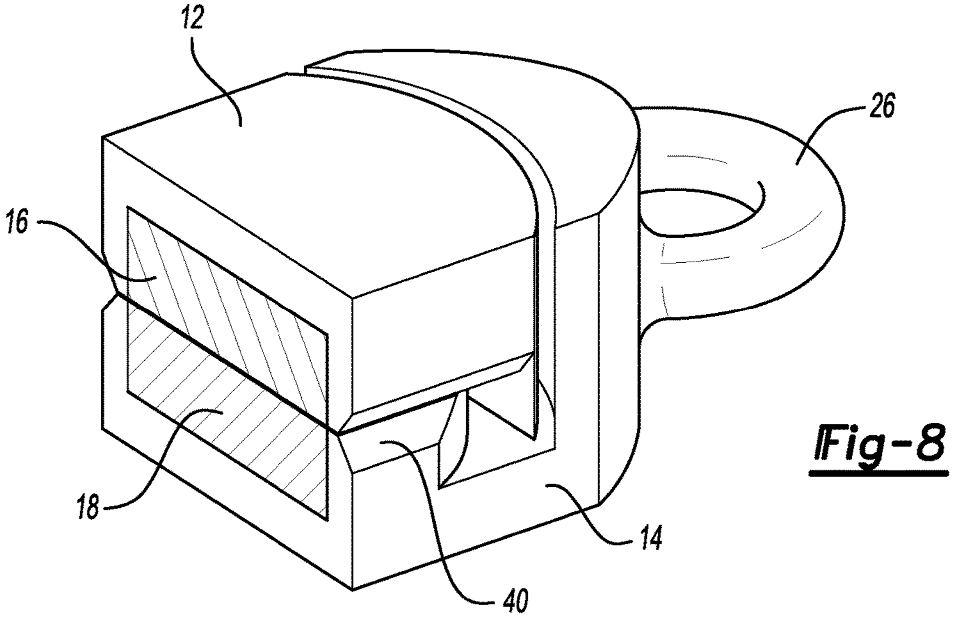
FIG. 8 is a sectional view of the example jewelry clasp.
Figure 9:
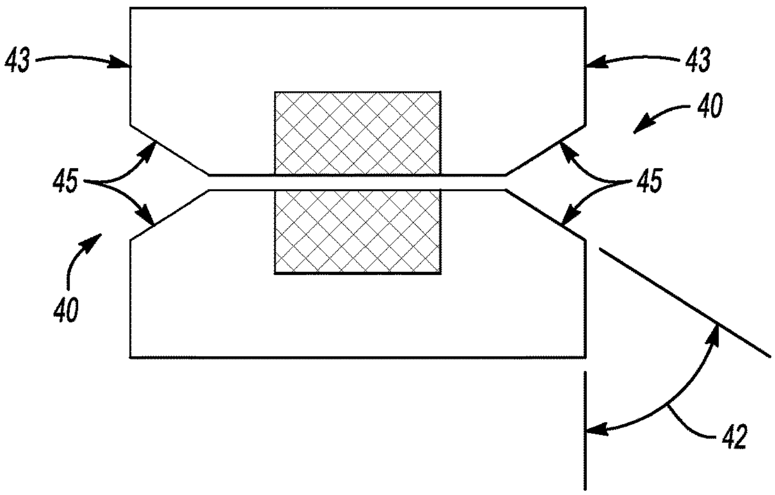
FIG. 9 is a cross-sectional view of the example jewelry clasp.
Figure 10:
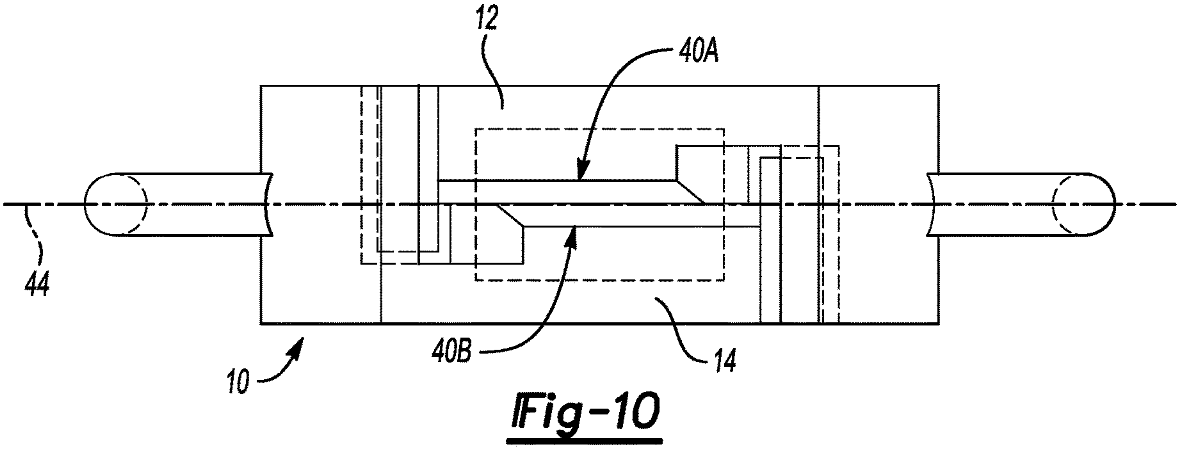
FIG. 10 is a side view of the example jewelry clasp.
Figure 11:
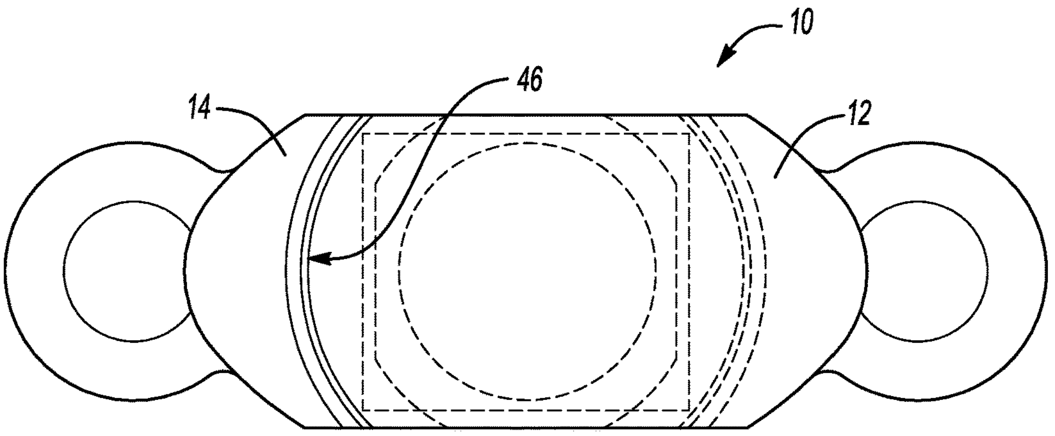
FIG. 11 is a top view of the example jewelry clasp.
Figure 12:
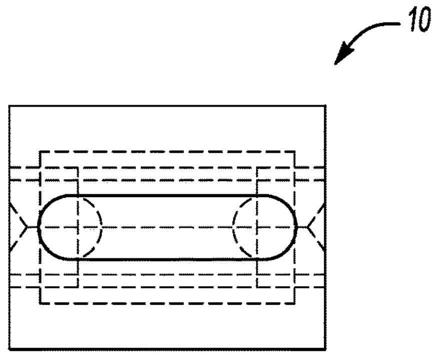
FIG. 12 is an end view of the example jewelry clasp.
Figure 13:
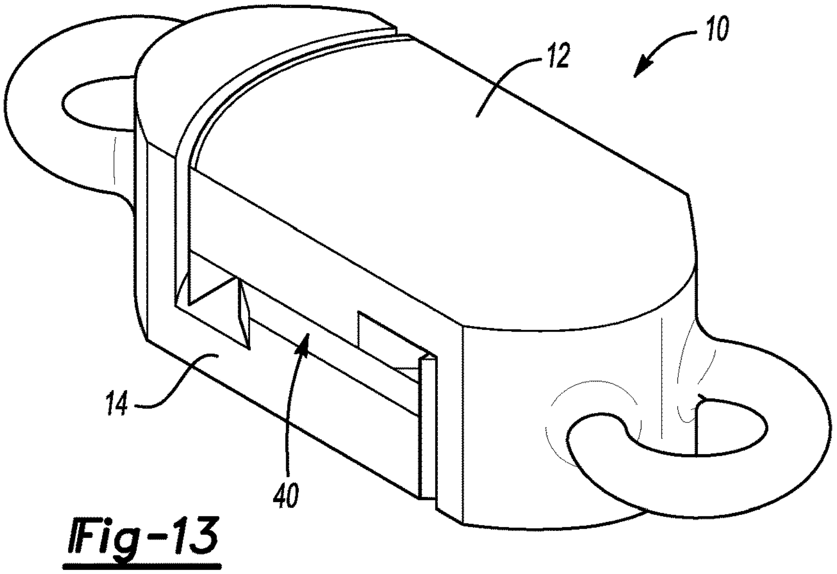
FIG. 13 is a perspective view of the example jewelry clasp.

Referring to FIGS. 3, 4 and 5 with continued reference to FIG. 2, the example clasp assembly 10 includes the magnets 16 and 18 that provide an attractive force that prevents pulling of the clasp parts 12, 14 apart in a direction indicated by arrows 38. Each of the clasp portions 12, 14 includes a groove 28, 30 that receives a catch 32, 34 of the other part 12, 14. The catch 32, 34 is engaged within the groove 28, 30 of the other one of the clasp portions 12, 14 to prevent pulling apart of the clasp assembly 10 in a direction indicated by the arrows 36.

The clasp assembly 10 is held firmly together with the magnets 16, 18 to prevent pulling apart in a direction indicated by the arrows 38 and the catches 32, 34 prevent pulling apart of the clasp 10 in a direction indicated by the arrows 36. In the disclosed embodiment, the direction of the arrows 38 is transverse to a longitudinal length and axis 44 of the clasp assembly 10. The arrows 36 are in a direction along the longitudinal length and axis 44 of the clasp assembly 10. The example clasp portions 12, 14 are substantially identical. The groove 30 of the second part 14 receives the catch 32 of the first part 12 and the groove of the first part 12 receives the catch 34 of the second part 14.

Referring to FIGS. 6, 7, 8 and 9 with continued reference to FIG. 3, the magnetic force provided by the magnets 16 and 18 is of such a magnitude that it can create difficulties in unlatching of the clasp parts 12, 14. The difficulty pulling the part apart the clasp portions 12, 14 is amplified for those with limited dexterity. In this example disclosed embodiment, the magnets 16 and 18 are rare earth magnets and formed from rare-earth elements. It should be appreciated that although other magnet materials could be utilized within the contemplation of this disclosure.

The example clasp assembly 10 includes a relief 40 on either side of the clasp assembly 10 to aid unlatching. Relief 40 is an angled surface on each of the clasp parts 12, 14 that create a groove into which a portion of a wearer's finger or fingernail may be inserted to enable prying apart of the parts 12 and 14 in a direction substantially indicated by arrow 38 (FIG. 3). It should be appreciated that although a specific configuration of the relief 40 is illustrated other relief shapes and angles are within the contemplation of this disclosure. The attractive force exerted by the magnets 16 and 18 are such that the clasp 10 is held securely in place until such time that it is pried apart at the relief 40.

It should be appreciated that the attractive forces provided by the magnets 16 and 18 decreases quickly as the distance between magnets increases. Accordingly, prying apart the first part 12 relative to the second part 14, even a small amount reduces the magnetic force sufficiently to enable unlatching, even for those with limited dexterity.

The example relief 40 includes surfaces 45 that are disposed at an angle 42 relative to a side surface 43 of the clasp parts 12, 14. The surfaces 45 are flat in this example, but could be contoured or rounded to provide a desired appearance without departing from the intent of this disclosure. The angle 42 may be different from the 45 degrees illustrated in the disclosed example and remain within the scope and contemplation of this disclosure.

Referring to FIGS. 10, 11, 12 and 13, the example clasp assembly 10 is illustrated and shown with the relief 40. The relief 40 includes the surfaces 45 defined on both the first part 12 and the second part 14. The relief surfaces 45 define the groove that aids in prying apart the clasp parts 12 and 14. The relief surfaces 45, in this disclosed embodiment, mate together when the clasp 10 is in its secured configuration as is illustrated in FIGS. 10-13.

Figure 14:
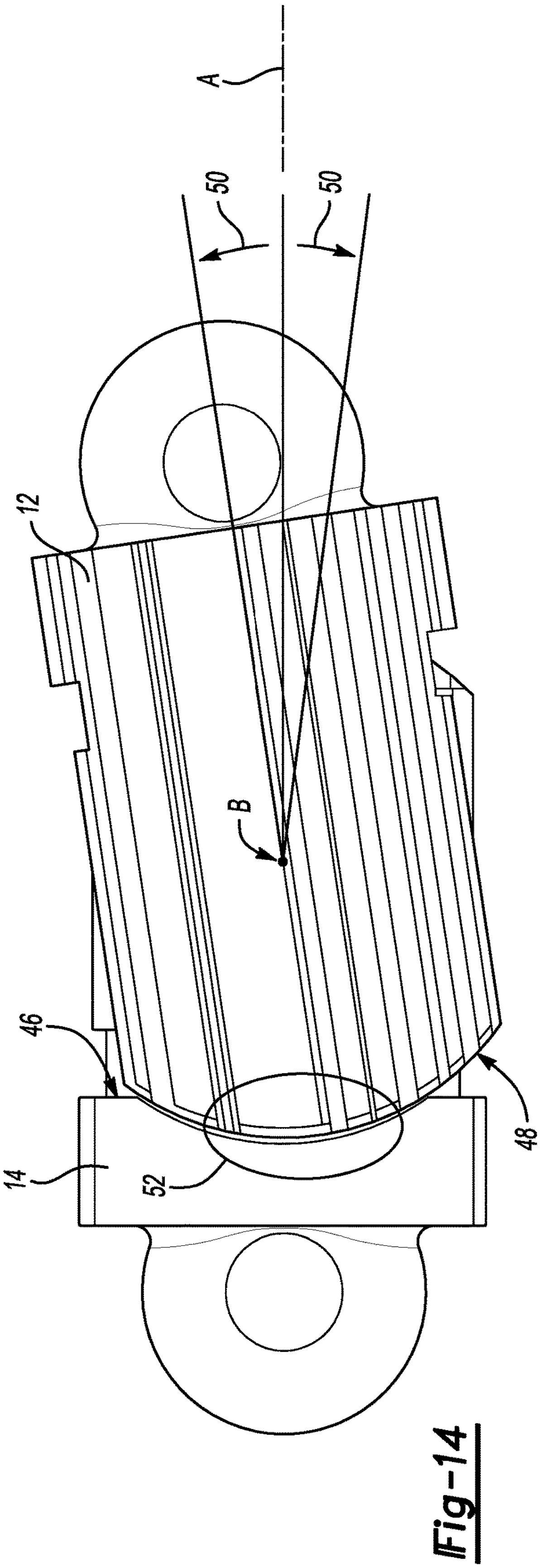
FIG. 14 is a top view of the example jewelry clasp with parts in a pivoted orientation.
Figure 15:
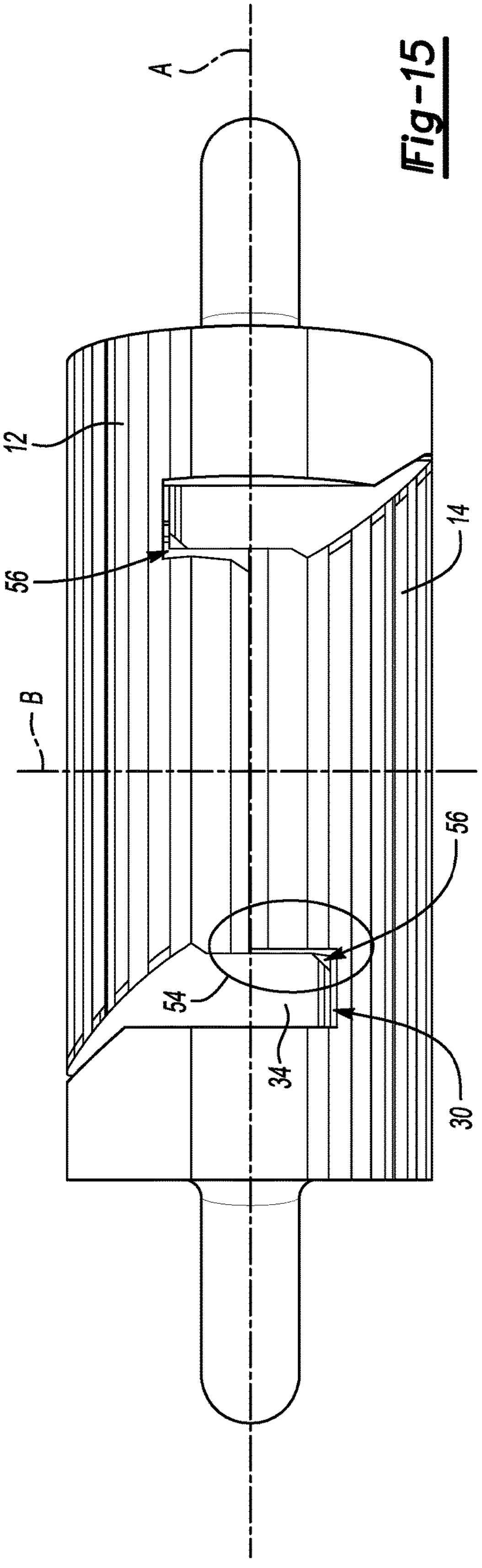
FIG. 15 is a side view of the example jewelry clasp.

Referring to FIGS. 14 and 15, although the clasp 10 may be unlatched easily through insertion of an item or object within the relief 40, the clasp 10 remains secured together until such time as it is pried apart. Accordingly, forces exerted on the jewelry item through normal wear are not sufficient to dislodge the magnets 16 and 18. Moreover, normal use is not sufficient to pull the clasp apart in a direction indicated by arrows 36 as shown in FIG. 3. Forces in the direction indicated by the arrows 36 causes the clasp catches 32 and 34 to engage corresponding grooves 28 and 30 and prevent movement to dislodge the magnets and thereby maintain the clasp 10 in the latched configuration.

Moreover, the clasp 10 includes features that allow some movement between the first part 12 and the second part 14 while still maintaining the connection. The guided surface 48 is able to slide along the guide surface 46 to enable pivoting about a center axis B. The center axis B is transverse to the longitudinal axis A. The corresponding curved contour of the guide surface 46 and the guided surface 48 enables a range of pivoting movement about the axis B. In this example, the range of pivoting movement is approximately 30 degrees on either side of the axis A. It should be understood that although 30 degrees is disclosed by way of example, other angles could be utilized that maintain the magnets in sufficient proximity to enable the clasp parts 12, 14 to move back together responsive to the magnetic force once the outside force is removed. The catch 34 of each of the parts 12, 14 includes a contact surface 56 that abuts a surface defining the groove 30 at the contact point schematically shown at 54 to limit the pivoting range.

Moreover, the corresponding contours of the guide surface 48 and the guided surface 48 drive the first part and the second part 12, 14 into alignment along the axis A. Any misalignment between the first part 12 and the second part 14 result in a mismatch between the guide surface 46 and the guided surface 48. As the magnets 16, 18 attract each other, the guided surface 48 moves along the guide surface 46 until the corresponding surfaces align along the axis A. Accordingly, the disclosed clasp 10 enables some relative pivoting movement to prevent release, and then corrects the alignment due to the attractive forces generated by the magnets 16, 18.

Figure 16:
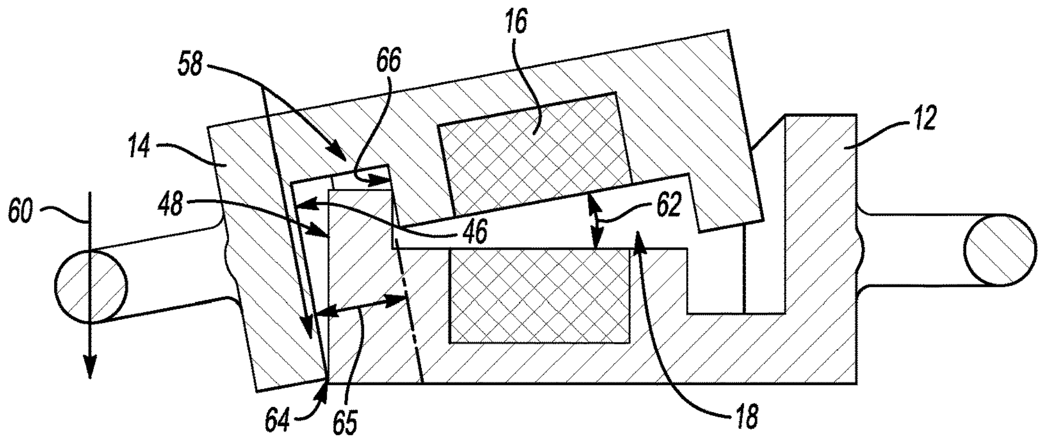
FIG. 16 is a side view of the example clasp in a tipped condition.
Figure 17:
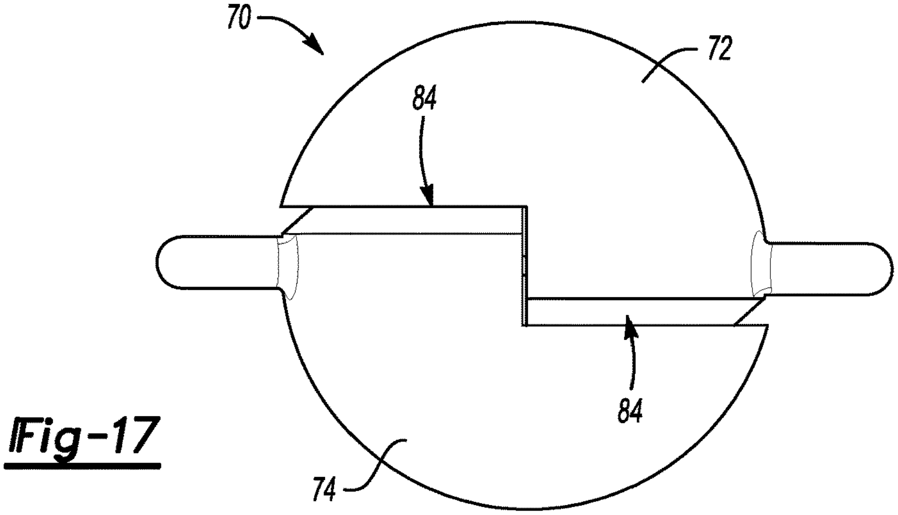
FIG. 17 is a side view of a spherically shaped example jewelry clasp embodiment.
Figure 18:
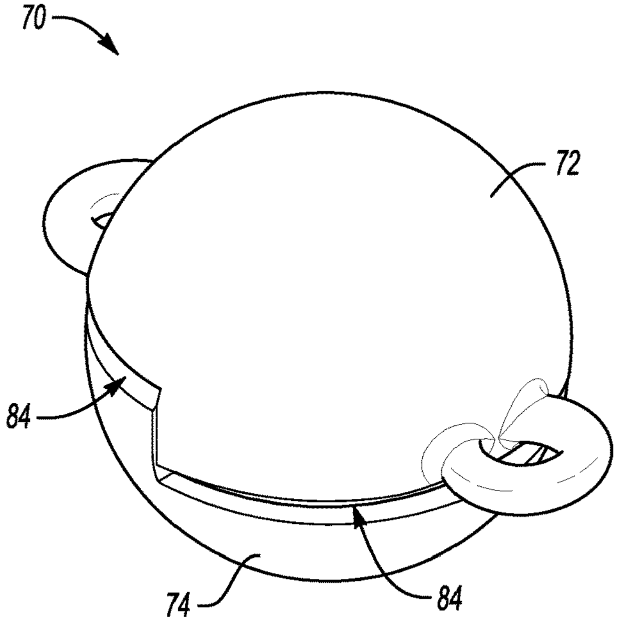
FIG. 18 is a perspective view of the spherically shaped example jewelry clasp embodiment
Figure 19:
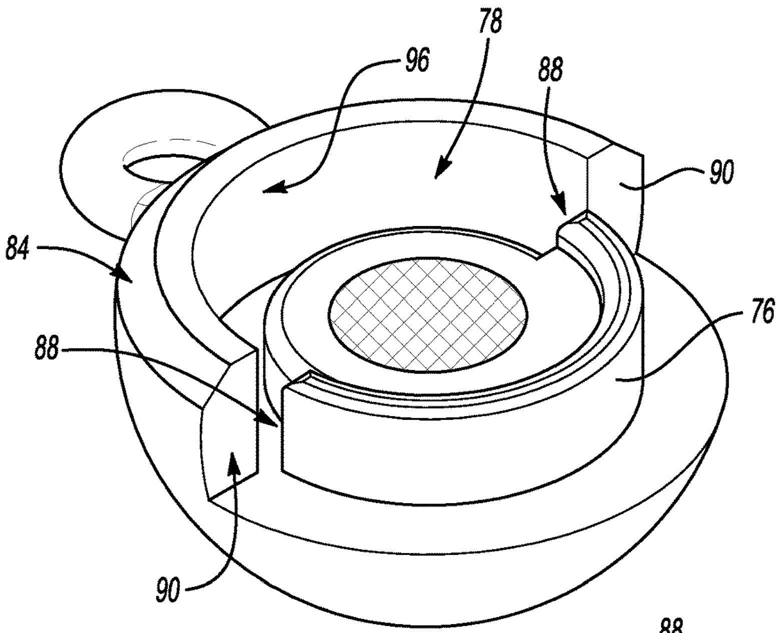
FIG. 19 is a side perspective view of one part of the spherically shaped jewelry clasp embodiment of FIG. 17.
Figure 20:
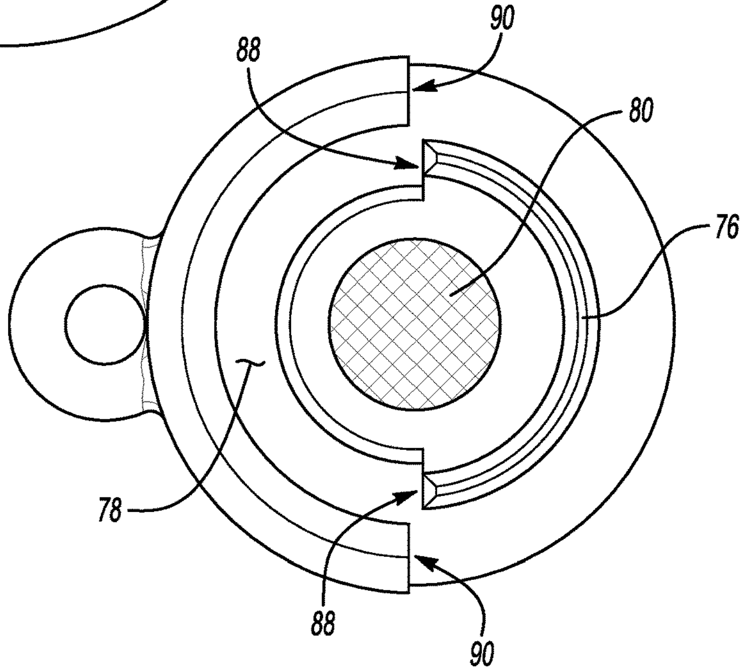
FIG. 20, is a top view of one part of the spherically shaped jewelry clasp embodiment of FIG. 17.

Referring to FIG. 16, the clasp 10 further defines contact points 58 that prevent a tipping force as shown by arrow 60 from dislodging the two parts 12, 14. The bottom corner 64 of the guide surface 46 is spaced relative to the inside surface 66 of the groove 30 to limit movement of the two parts 12, 14 in response to the tipping force 60. Contact at the points schematically shown at 58 limit the spacing 62 between the magnets 16, 18. The spacing 62 is limited such that the attractive magnetic forces provided by the magnets 16, 18 is sufficient to pull the two parts 12, 14 back to a coupled and clasped position upon release of the tipping force 60. It should be appreciated, that each of the two parts 12, 14 include similar features and contact points such that a corresponding force on the other part in the direction would also be limited as is illustrated in FIG. 16.

Referring to FIGS. 17, 18, 19 and 20, another example jewelry clasp embodiment 70 is shown and is spherically shaped with identical first and second mating parts 72, 74. The spherical shape splits in half at an interface. The interface includes a relief 84 that enables the two parts 72, 74 to be split apart. In this example, the relief 84 is split such that portions of the relief 84 are disposed on different planes. Each of the parts 72, 74 include a groove 78 that receives a catch 76 of the other part. The groove 78 and catch 76 in this example embodiment are spaced apart to allow approximately 15 degrees of tipping movement and still be able to maintain the magnets in proximity such that upon release of the exterior forces, the attractive forces provided by the magnets will close the parts 72, 74. Moreover, although 15 degrees is disclosed by way of example, other angles are within the contemplation and scope of this disclosure. The catch 76 and groove are annular sections that have a radius centered about an axis 86. The catch 76 of each part 72, 74 about at surfaces 88 to prevent rotation about the axis 86. The grooves 78 are defined by an outer wall 96 that includes end surfaces 90 that abut one another to further prevent relative rotation. Moreover, the features of the previously disclosed and described clasp embodiments that prevent errant release are also present in the clasp 70. Accordingly, different shapes may be utilized as can be contemplated by one skilled in the art and remain with the scope of this disclosure.

Figure 21:
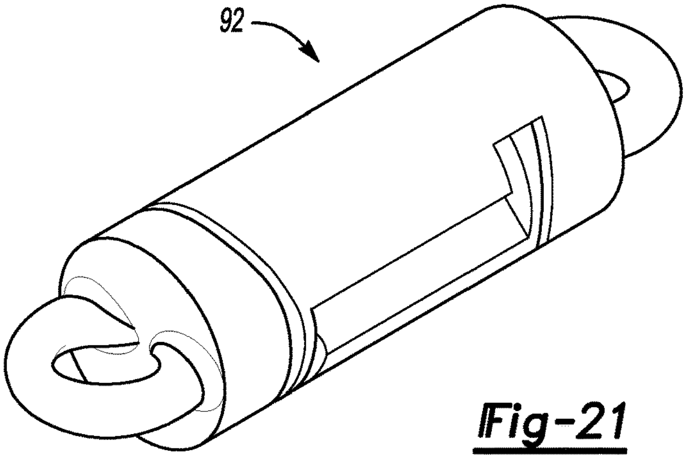
FIG. 21 is a perspective view of another example jewelry clasp embodiment.
Figure 22:
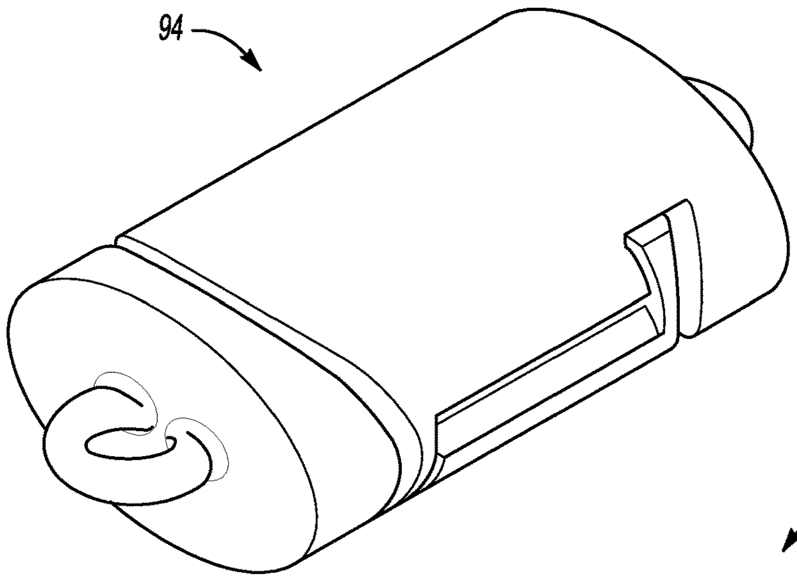
FIG. 22 is a perspective view of yet another example jewelry clasp embodiment.
Figure 23:
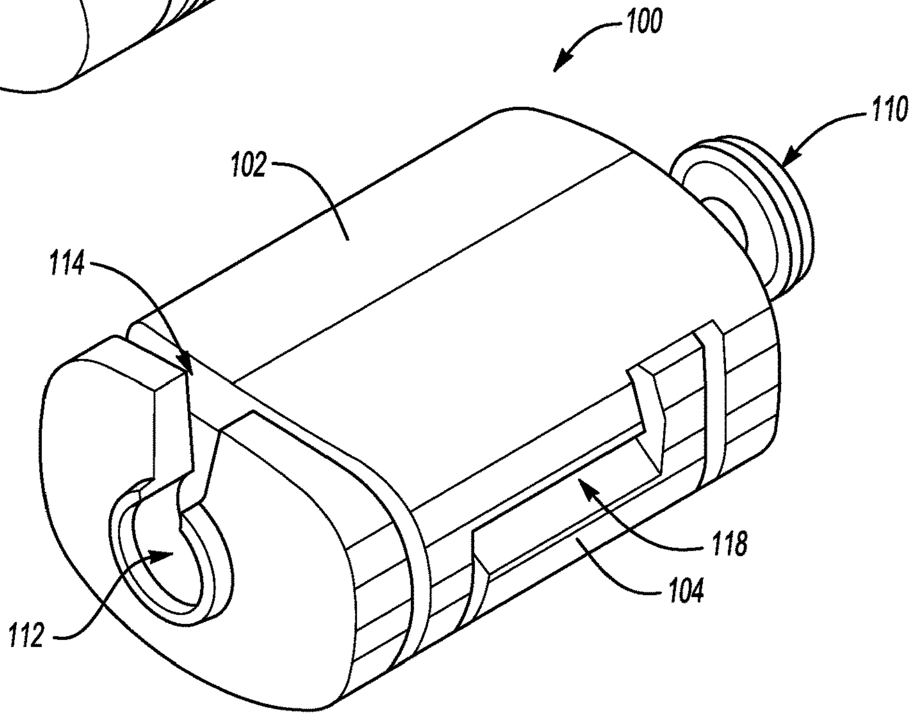
FIG. 23 is a perspective view of another example jewelry clasp embodiment with an alternate attachment configuration.
Figure 24:
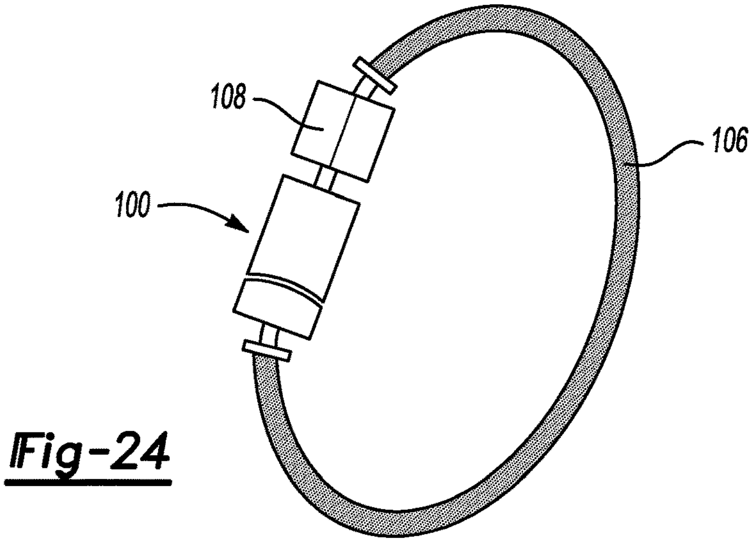
FIG. 24 is a schematic view of a jewelry item including the example jewelry clasp of FIG. 23.
Figure 25:
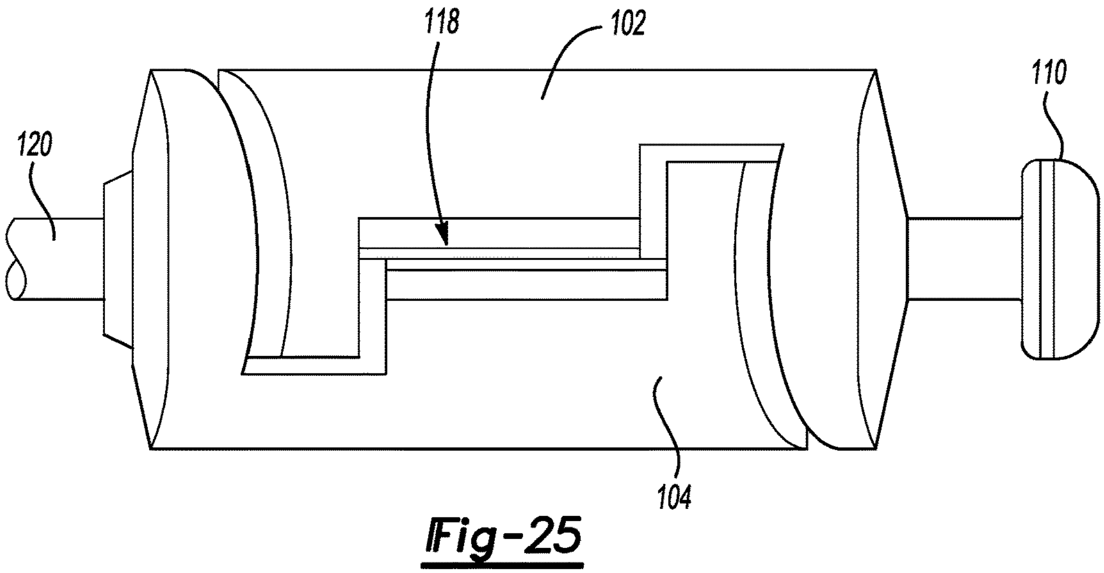
FIG. 25 is a side view of the example jewelry clasp embodiment of FIG. 23.
Figure 26:
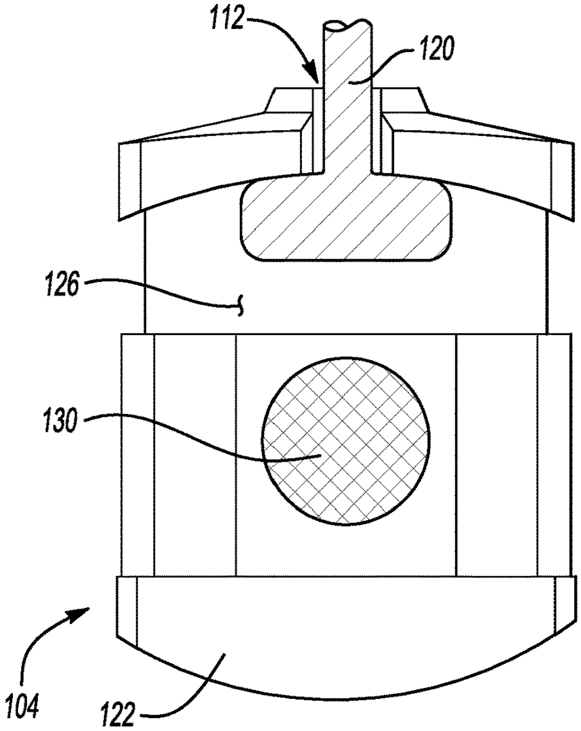
FIG. 26 is a top view of one part of the example jewelry clasp embodiment of FIG. 23.
Figure 27:
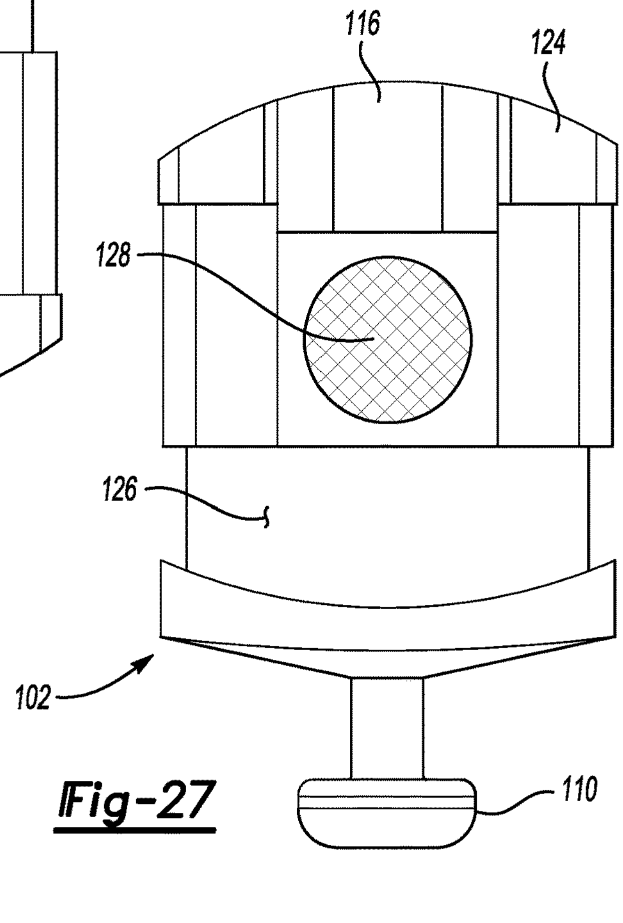
FIG. 27 is a top view of another part of the example jewelry clasp embodiment of FIG. 23.
Figure 28:
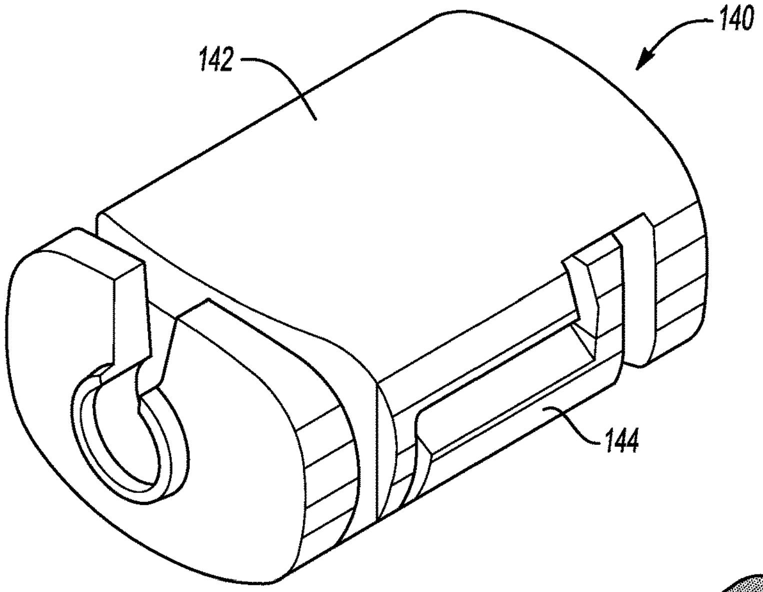
FIG. 28 is a perspective view of yet another example jewelry clasp embodiment with another alternate attachment configuration.
Figure 29:
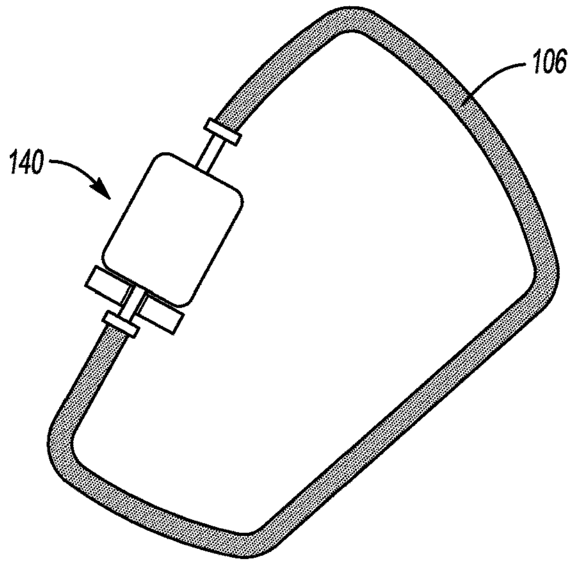
FIG. 29, is a schematic view of a jewelry item including the example jewelry clasp embodiment of FIG. 28.
Figure 30:
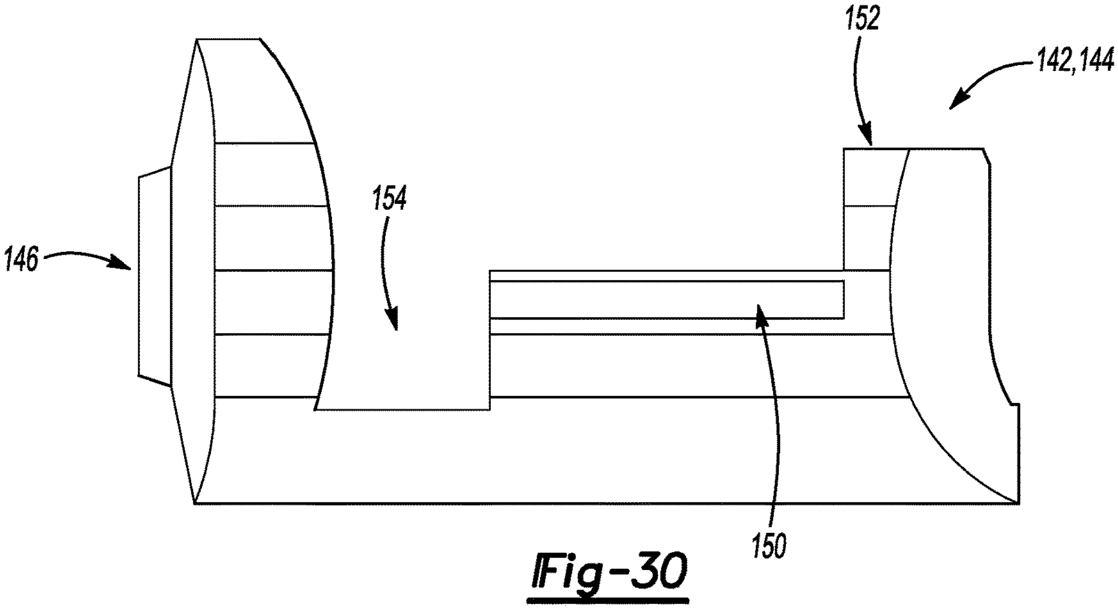
FIG. 30 is a side view of one part of the example jewelry clasp of FIG. 28.
Figure 31:
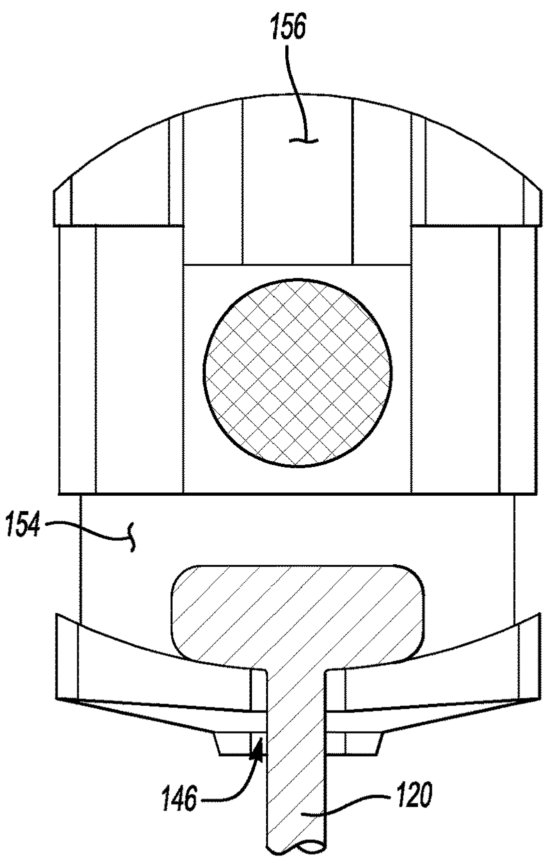
FIG. 31 is a top view of one part of the example jewelry clasp of FIG. 28.
Figure 32:
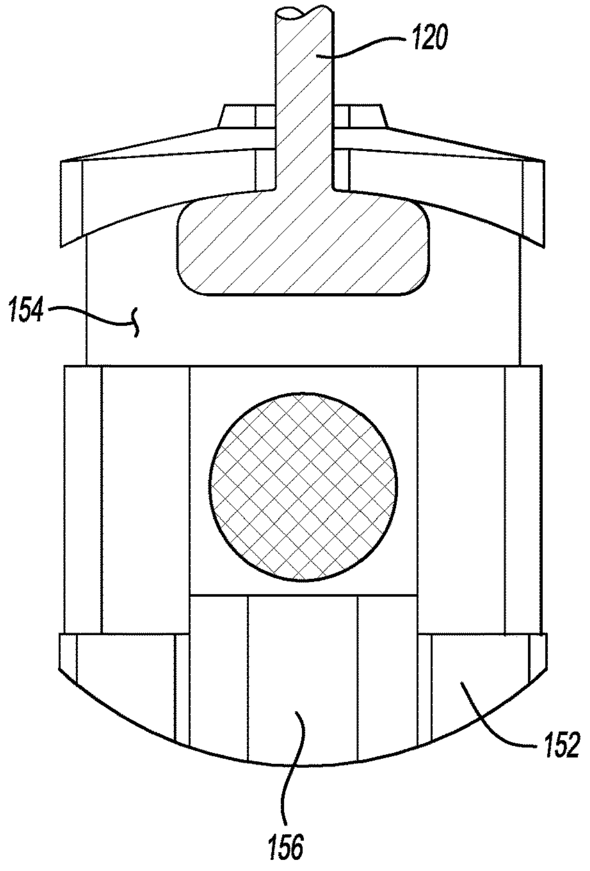
FIG. 32 is a top view of another part of the example jewelry clasp of FIG. 28.

Referring to FIGS. 21 and 22, two additional example jewelry clasp embodiments 92, 94 are shown. The clasp 92 includes a generally oval shape in cross-section and illustrates that he exterior surface and shape may be modified to provide a desired aesthetic appearance that corresponds with a jewelry item. The clasp 94 also includes a generally oval cross-section shape that is flatter in appearance to provide yet another outer surface configuration that can be adapted to correspond with an aesthetic appearance desired of a jewelry item. Moreover, the flatter oval shape provided by clasp 94 provides an increased resistance to rolling over when unclasping with one hand. When a fingernail is used to open the clasp 94, the elongation in the direction transvers to the longitudinal length prevents flipping over in response to separating parts from each other and therefore eases unclasping. Each of the clasps 92, 94 include the attachment features disclosed and described in detail above.

Referring to FIGS. 23, 24, 25, 26 and 27, another example clasp 100 is shown and includes an attachment pin 110 on a first part 102 and an opening 112 on a second part 104. The opening 112 on the second part 104 is for receiving a pin 120 integrated into a jewelry item 106. In this example, the attachment pin 110 is received within an existing clasp 108 of the jewelry item 106 and the opening receives the pin 120. The clasp 100 is therefore able to be fitted for use with an existing jewelry item 106 without removal of existing clasp structures. In this example, the jewelry item 106 includes the clasp 108 that is configured to receive a pin 120. The clasp 100 includes similarly configured attachment pin 110 that is instead accepted into the existing clasp 108. The pin 120 of the other end of the jewelry item 106 is then received within the opening 112 of the clasp 100. The pin 120 is slipped into the opening through a notch 114. The notch 120 is a tight to interference fit to retain the pin 120 within the part 104. The head of the pin 120 is received within a space of a groove 126.

The first part 102 and second part 104 of the clasp 100 are differently configured to adapt to attachment to the existing clasp features of the jewelry item 106. In this example, the part 104 includes the pin 110 and the part 102 includes the opening 112. The first part 102 includes a catch 124 and a groove 126. The catch 124 includes a slot 116 that provides room for the head of the pin 120 when the parts 102 and 104 are coupled together. The second part 105 includes a catch 122 that is received within the groove 126 of the first part 102. Each of the first part and the second part include a magnet 128, 130 that operate to hold the parts 102 and 104 together as disclosed and explained above. Moreover, the clasp 100 includes the relief 118 that enables release of the parts 102, 104 as disclosed in detail above. The clasp 100 includes the features discussed above that accept some movement while maintaining connection.

Referring to FIGS. 28, 29, 30, 31 and 32, another example clasp embodiment 140 includes features to replace an existing clasp of a jewelry item 106. In this example, the jewelry item 106 includes posts 120 and the example clasp 140 includes identical first and second parts 142, 144 that accept the existing pins 120. Each of the parts 142, 144 include an opening 146 that accepts the pins 120 and a notch 156 within each catch 152 accommodates a head of the pins 120. The clasp 140 includes the relief 150 enables quick release to remove the jewelry item. The groove 154 and the catch 152 operate with the magnets to allow some relative movement without detaching during use and until pried apart at the relief 150.

Accordingly, the example clasps 100 and 140 provide for adaptation to existing jewelry items. It should be appreciated that although a specific configuration is shown, other jewelry clasp arrangements could also be adapted for use with the disclosed clasps and is within the contemplation of this disclosure.

Accordingly, the example clasp assembly 10 includes features to enable some relative movement between parts in different directions to prevent errant release from the secured position while also including features that enable the release when desired. Moreover, the disclosed clasp 10 includes features that automatically align the parts 12, 14 to ease coupling.

Although an example embodiment has been disclosed, a worker of ordinary skill in this art would recognize that the above disclosure is not just a material specification and that certain modifications would come within the scope of this disclosure. For that reason, the following claims should be studied to determine the scope and content of this disclosure.

What is claimed is:

1. A jewelry clasp comprising:

a first part including a first groove, a first catch and a first ring segment; and a second part including a second groove that receives the first catch, a second catch that is received within the first groove and a second ring segment;

at least one magnet generating an attractive force holding the first part to the second part; and at least one contact point between the first part and the second part that is configured to prevent unintended dislodging of the first part from the second part by limiting a spacing relative to the at least one magnet to a distance where a magnetic force generated by the at least one magnet is sufficient to pull the first part and the second part back to a coupled position, wherein the at least one magnet comprises a first magnet disposed in the first part and second magnet disposed in the second part and the second groove is on a side of the second magnet opposite the second catch.

2. The jewelry clasp as recited in claim 1, wherein each of the first groove and the second groove include a guide surface and the first catch and the second catch each include a guided surface in contact with the guide surface such that the first part and the second part are pulled into centered alignment along the longitudinal length by the attractive force provided by the at least one magnet.

3. The jewelry clasp as recited in claim 2, wherein a bottom corner of the one of the guide surfaces is spaced relative to an inside surface of a corresponding one of the first and second grooves to limit movement of the first and second parts in response to a tipping force, wherein the engagement of the at least one contact point limits the spacing between the first part and the second part such that the attractive magnetic forces provided by the at least one magnet is sufficient to pull the first and second parts back to a coupled position upon release of the tipping force.

4. The jewelry clasp as recited in claim 1, including an angled surface disposed on at least one of the first part and the second part at an interface between the first part and the second part to aid in releasing the first part from the second part.

5. The jewelry clasp as recited in claim 4, wherein the first groove is one side of the at least one magnet opposite the first catch.

6. The jewelry clasp as recited in claim 1, wherein the first groove and the second groove are both open to each side to enable relative pivoting movement between the first part and the second part around an axis extending in transverse to a longitudinal length of the first part and the second part.

7. The jewelry clasp as recited in claim 1, wherein the first part and the second part include a cross-section when in the coupled position that is one of an oval shape, spherical shape and rectilinear shape.

8. The jewelry clasp as recited in claim 1, wherein at least one of the of the first part and the second part include a cavity for receiving the at least one magnet.

9. The jewelry clasp as recited in claim 1, wherein each of the at least one magnet is flush with an inner surface of each of the first part and the second part.

10. The jewelry clasp as recited in claim 9, wherein the first part and the second part are formed from non-magnetic material.

11. A clasp for a jewelry item, the clasp comprising:

a first part including a first magnet generating a magnetic force, a first groove, a first catch; and a second part including a second magnet generating an attractive force in a first direction for holding the first part to the second part and a second groove that receives the first catch and a second catch that is received within the first groove for holding the first part to the second part in a second direction transverse to the first direction, wherein each of the first groove and second groove are configured to enable relative pivoting movement between the first part and the second part around an axis transverse to a longitudinal length of the first part and the second part, and wherein at least one of the first part and the second part includes a ring segment configured for attachment of an elongated jewelry item.

12. The clasp as recited in claim 11, including at least one relief disposed at an interface between the first part and the second part to aid in releasing the first part from the second part, wherein the relief comprises an angled surface along the interface between the first part and the second part.

13. The clasp as recited in claim 11, wherein the first groove and the second groove are curved and the first catch and the second catch are movable within the corresponding one of the first groove and the second groove about an axis transverse to a longitudinal length of each of the first part and the second part.

14. The jewelry item as recited in claim 11, wherein each of the first groove and the second groove include a guide surface transverse to the second direction and the first catch and the second catch each include a guided surface in contact with the guide surface such that the attractive force between the first magnet and the second magnet moves the first part and the second part into centered alignment along the longitudinal length.

15. The jewelry item as recited in claim 14, wherein a bottom corner of the one of the guide surfaces is spaced relative to an inside surface of a corresponding one of the first and second grooves to limit movement of the first and second parts in response to a tipping force, wherein the engagement of the contact points limit the spacing between the first and second magnets such that the attractive magnetic forces provided by the first and second magnets is sufficient to pull the first and second parts back to a coupled position upon release of the tipping force.

16. A clasp comprising:

a first part including a first groove and first catch; and a second part including a second groove that receives the first catch and a second catch that is received within the first groove; and at least one magnet generating an attractive force holding the first part to the second part, wherein each of the first catch and the second catch are smaller than a corresponding one of the first groove and second groove such that the first part and the second part are movable relative to each other around an axis transverse to a longitudinal length of the first part and the second part, and at least one contact point defined between at least one of the first groove and the second groove and a corresponding one of the first catch and second catch to prevent unintended dislodging of the first part from the second part by limiting a spacing relative to the at least one magnet to a distance where a magnetic force generated by the at least one magnet is sufficient to pull the first part and the second part back to a coupled position.

17. The clasp as recited in claim 16, wherein at least one of the first part and the second part include an including an indentation disposed on at least one of the first part and the second part at an interface between the first part and the second part to aid in releasing the first part from the second part.

* * * * *